United States Patent [19]

Sklarchuck et al.

[11] Patent Number: 5,122,375
[45] Date of Patent: Jun. 16, 1992

[54] ZINC ELECTRODE FOR ALKALINE BATTERIES

[75] Inventors: Jack Sklarchuck, Burlington; Eugene M. Valeriote, Oakville, both of Canada

[73] Assignee: Cominco Ltd., Vancouver, Canada

[21] Appl. No.: 553,199

[22] Filed: Jul. 16, 1990

[51] Int. Cl.$^5$ .............................................. H01M 4/42
[52] U.S. Cl. .................................. 429/229; 427/123; 252/182.1
[58] Field of Search ..................... 252/182.1; 429/229; 427/123

[56] References Cited

U.S. PATENT DOCUMENTS

| | | | |
|---|---|---|---|
| 4,812,374 | 3/1989 | Kagawa et al. | 429/229 X |
| 4,861,688 | 8/1989 | Miura et al. | 429/229 X |
| 4,994,333 | 2/1991 | Jose et al. | 429/229 X |

OTHER PUBLICATIONS

Miura, *Patent Abstracts of Japan*, for Kokai No. 63-178451, Jul. 1988.

Hikosaka, *Patent Abstracts of Japan* for Kokai No. 63-304571, Dec. 1988.

*Primary Examiner*—Stephen Kalafut
*Attorney, Agent, or Firm*—Arne I. Fors

[57] ABSTRACT

A negative zinc electrode for use in an alkaline battery has an active material consisting of zinc-magnesium alloy containing magnesium in an amount in the range of greater than 0% to about 15% by weight. The zinc-magnesium alloy may also contain a small amount of an additive metal that reduces the hydrogen overvoltage or an effective amount of an additive metal that increases the porosity, such as from 5 to 25% aluminum by weight of the zinc. The zinc-magnesium alloy is applied in particulate form to a suitable current collector using any one of a number of conventional methods such as die-pressing, mixing with a filler or a polymer and heating, sintering or compaction. The electrode has a cycle life longer than that of a conventional zinc oxide-based electrode, and causes little or no formation of dendrites.

33 Claims, No Drawings

ZINC ELECTRODE FOR ALKALINE BATTERIES

This invention relates to alkaline batteries and, more particularly, to a zinc electrode having an active material containing zinc-magnesium alloy.

BACKGROUND OF THE INVENTION

An alkaline battery consists of at least a positive electrode, a zinc negative electrode, separators to keep the electrodes from touching each other and a cell case and connectors. Ideally, the zinc electrode should be made of zinc but the fabrication of a suitable electrode made of zinc has until now not been successful. Zinc electrodes are presently mainly made of zinc oxide and additives applied to a substrate. The battery has an energy density higher than, but a cycle life shorter than that of a lead-acid battery.

There are two reasons for the short cycle life. When zinc metal is converted to zinc oxide in the alkaline electrolyte during discharging, the zinc oxide dissolves into the electrolyte until the solution is saturated. When the cell is being recharged, that dissolved zinc oxide is being plated out of solution in the form of metallic zinc. When zinc is plated out of the alkaline electrolyte, dendrites tend to form. The dendrites will eventually penetrate through the separators and cause a short-circuit, and cause the cell to discharge at a high current. Eventually, the cell will no longer be able to be recharged or even sustain an open circuit voltage.

Dendrites tend to form predominantly during charging of the battery, and especially during the overcharge portion of the charge cycle. The formation of dendrites is usually avoided by special charging techniques and by maintaining an excess of zinc oxide in the zinc electrode.

The second reason for the short cycle life is that zinc electrodes are made by applying some composition of zinc, zinc oxide and certain additives to a suitable current collector. The zinc metal and/or zinc oxide particles are usually held together and are held to the current collector by some polymer material, such as Teflon$_{198}$ or other polymers. During cycling, the active material of the zinc electrode tends to shift towards the bottom and bottom centre of the electrode. This not only reduces the surface area of the electrode but also leads to the formation of dendrites because the current, especially when charging, is concentrated on a smaller area.

BRIEF DESCRIPTION OF PRIOR ART

In efforts to overcome the above-mentioned problems, metallic additions to the zinc or zinc oxide have been used. According to U.S. Pat. No. 3 042 732, an improved anode in a nickel oxide-zinc secondary alkaline cell is provided which comprises the combination of powdered zinc with powdered lead oxide, copper, copper oxide or magnesium, present in an amount that prevents gassing on deep discharge, the powdered zinc and powdered additive being intermixed throughout the anode. The improved anode may also contain a plurality of zinc-plated magnesium powders. According to French Patent 1 004 463, the active material of a zinc anode for a nickel oxide-zinc battery may consist of zinc oxide or zinc powder with 10% to 20% added magnesium powder; the powder mixture is pressed as a paste onto a grid of zinc or magnesium. Tomassi, W. (Chem. Abs. 81:138455f, 98440p, 130154m and 98552b) has studied the electrode potentials, the corrosion, migration kinetics and x-ray diffractions of negative electrodes for metal-oxygen cells, and, particularly, of zinc electrodes with additions of magnesium, aluminum, their alloys and mixtures. The porous electrodes are made by die-pressing of powdered mixtures of zinc with aluminum powder and/or magnesium powder in amounts of 5-20% Mg and 5-40% Al, respectively. Mukherjee, D. etal. (Transactions SAEST, Vol. 22, No. 1, 1987) studied the polarization behaviour of binary alloys of zinc with 3% Al, Cd or Mg in potassium hydroxide solution.

All these prior art zinc electrodes are made with powdered mixtures including zinc powder and magnesium powder. None of the prior art references discloses an active material for a zinc electrode for an alkaline battery that contains an alloy of zinc and magnesium.

SUMMARY OF THE INVENTION

It has now been found that the formation of dendrites in an alkaline battery can be substantially alleviated and that the cycle life can be considerably increased by using a zinc electrode with an active material that comprises zinc-magnesium alloy.

It is an aspect of the present invention to provide a zinc electrode that does not form dendrites in alkaline batteries. It is another aspect to provide a zinc electrode that has an active material containing zinc-magnesium alloy.

Accordingly, there is provided a zinc electrode for use in an alkaline battery consisting of a current collector and an active material applied to said current collector, said active material comprising zinc-magnesium alloy containing magnesium in the range of from greater than 0% to about 15% by weight.

Accordingly, there is also provided a zinc electrode for use in an alkaline battery consisting of a current collector, made of metal chosen from the group consisting of copper, silver, titanium, stainless steel and magnesium, and an active material applied to said current collector by compaction, die-pressing, cold-welding, sintering, or mixing with a binder material, a filler material or both and heating, said active material comprising zinc-magnesium alloy containing magnesium in the range of from greater than 0% to about 15% by weight.

According to a second embodiment, there is provided a method of producing a zinc electrode which comprises the steps of forming a zinc-magnesium alloy containing from greater than 0% to about 15% by weight of magnesium, forming a particulate of said alloy, and applying the particulate alloy to a current collector by one of compaction, die-pressing, cold welding, sintering, and mixing with a binder material, filler material or both and heating.

The aspects of the invention and the manner in which they are attained will be apparent from the following detailed description.

DETAILED DESCRIPTION

The negative electrodes for alkaline batteries according to the invention are prepared by alloying zinc with magnesium and applying the alloy to a suitable current collector. The alloying of zinc and magnesium is carried out by conventional means such as by melting zinc and magnesium in amounts that yield the desired alloy composition at a temperature of, for example, 500° C., and then solidifying the alloy such as by casting in the form of ribbons, strips or other suitable forms. The cast alloy is readily pulverized to desired particle sizes, which are, preferably, in the range of about 37 to 150 microns.

Suitable zinc-magnesium alloys are alloys that contain magnesium in the range of from greater than 0% to about 15% by weight. Preferably, the magnesium content is in the range of about 1% to about 10% by weight. Below about 1% magnesium, the electrode behaves nearly like pure zinc, which is subject to extensive dendrite formation, while above about 15% magnesium, the electrode has too low a utilization to be of practical use. Above about 10% magnesium, the zinc electrode becomes increasingly inert.

During the alloying of zinc and magnesium, a small amount of an additive metal may be added which is effective to reduce the hydrogen overvoltage of the electrode. Additive metals such as, for example, lead, indium, thallium, mercury or cadmium added in an effective amount of, for example, about 1% by weight are effective in reducing hydrogen evolution in an alkaline battery during use. If desired an effective amount of an additive metal such as, for example, aluminum in the range of about 5% to about 25% by weight of zinc, preferably about 22% by weight of the zinc, may be used to increase the porosity of the zinc electrode. The aluminum is leached from the zinc-aluminum-magnesium alloy after fabrication of the electrode. The zinc-magnesium alloy, with or without additive metals, is applied to a suitable current collector. Suitable current collectors are made of metals such as, for example, silver, copper, titanium, stainless steel or magnesium. The current collector is, preferably, an expanded metal mesh, although other forms of metal current collectors may be used. The alloy is applied to the current collector by conventional means such as, for example, by compaction, die-pressing, cold-welding, sintering, and mixing alloy with a suitable binder material or filler material, or both, and heating.

The electrode so produced has a layer of active material consisting of zinc-magnesium alloy. The electrode does not have to be charged, as it is already in the charged state. The electrode of the invention, when used in an alkaline battery, has a cycle life longer than conventional zinc oxide-based electrodes, and causes little or no formation of dendrites.

The invention will now be illustrated by the following non-limitative examples. In the examples the electrodes were cyclically charged at a constant potential of 1.93 V with a 25% overcharge, and were discharged at a constant current in the range of about 1 to 10 mA/cm$^2$.

EXAMPLE 1

Solid discs of zinc, zinc-magnesium alloys and zinc-magnesium-lead alloys were each assembled into a cell to become a zinc electrode. Located 0.5 mm above the zinc electrode was a silver metal screen, and 2 cm above that was a platinum counter-electrode. Using a programmable potentiostat and a strip recorder, the zinc electrode was cycled within the boundaries for a zinc electrode when used in a conventional zinc electrode-containing battery. A 35% KOH, zincate-free electrolyte was used, and cycling of the electrode consisted of a charge and a discharge; no open circuit times were used. As cycling progressed, zinc dissolved into the electrolyte during discharging and replated onto the electrode during charging. When replating, zinc tends to form dendrites which will contact the silver grid just above the zinc electrode. The potential between the zinc electrode and silver screen was monitored by a strip recorder. When a dendrite touched the silver screen, that potential dropped to zero. The time when the drop in voltage occurred was determined. The results are shown in Table I.

TABLE I

| ALLOY | TIME TO ov (Zn VS. Ag) |
|---|---|
| Zinc (pure) | 25.5 min - shorted |
| Zinc - (1-1.5%) Mg | 37.5 min - H$_2$ evolved - no short |
| Zinc - 2.2% Mg | 31 min - H$_2$ evolved - no short |
| Zinc - 2.2% Mg, 1% Pb | 43 min - H$_2$ evolved - no short |

The pure zinc electrodes all failed after 25.5 minutes due to a dendrite contacting the silver screen. None of the alloy samples shorted, but the amount of hydrogen evolved increased with cycling until the recorder trace became erratic.

EXAMPLE 2

An alloy was made from zinc and 4% by weight of magnesium. A cleaned piece of copper expanded mesh was dipped into the melt. About 10 g of the melt adhered to the mesh upon retraction from the melt. The solid zinc-4% magnesium electrode was wrapped in two layers of Celgard $_{TM}$ separator (Celanese Corp.), and cycled in a Ni-Zn cell. The electrode was cycled as in Example 1. The results are shown in Table II.

TABLE II

| Cycles No. | Observation |
|---|---|
| 1-15 | Time to reach maximum capacity of 3.5 A.h |
| 16-31 | Capacity maintained 3.5 A.h |
| 32-75 | Capacity decreased gradually to 1.2 A.h |

The cycling was carried out to full depth discharge, and the charging was carried out with a 25% overcharge each cycle. Cycling started with a discharge as the zinc electrode was already in the charged state. Cycling was terminated because of low capacity; no signs of cell shorting were evident.

EXAMPLE 3

Three zinc electrodes were made by encasing active material in a flat tube fabricated from a commercial lead-acid battery separator. An expanded copper grid was inserted in the tube, the active material was evenly distributed over the grid, and the tube was heat-sealed. The electrodes contained zinc powder, zinc oxide powder or zinc-4% magnesium powder, particle sizes <74 microns, as the active material. The electrodes were cycled in a Ni-Zn cell as in Example 2. The results are given in Table III.

TABLE III

| Electrode | No of Cycles |
|---|---|
| Zinc (started with discharge; 35% KOH) | 5 |
| Zinc Oxide (started with 2 conditioning cycles; 35% KOH saturated with ZnO) | 5 |
| Zinc-4% Magnesium (started with discharge; 35% KOH) | 9 |

All electrodes shorted after the number of cycles shown in Table III. The low cycle life was due to the relatively large pores in the separator through which zinc dendrites could pass easily.

EXAMPLE 4

Three zinc electrodes were fabricated. The electrodes consisted of active material, a filler material (PbTiO$_4$) and a polymer binder (Teflon $_{TM}$) A paste was made from these components and spread onto a copper mesh grid. The electrodes were encased in 2 layers of Celgard ™ separator. The electrodes contained zinc powder, zinc oxide powder or zinc-4% magnesium powder, particle sizes <74 microns, as the active material. The electrodes were cycled in nickel-zinc cells as in Example 2. The results are shown in Table IV.

TABLE IV

| Electrode | No. of Cycles |
|---|---|
| Zinc (started with discharge; 35% KOH) | 5 |
| Zinc Oxide (started with 2 conditioning cycles; 35% KOH saturated with ZnO) | 5 |
| Zinc-4% Magnesium (35% KOH) | 53 |

The results shown in Table IV indicate that zinc electrodes having an active material of zinc-magnesium alloy have a much longer cycle life than a zinc- or zinc-oxide-based electrode.

EXAMPLE 5

Three electrodes were made by applying a mixture of two zinc-magnesium alloys, having particle sizes <500 microns, to a magnesium or copper grid substrate and sintering at 375° C. for a time sufficient to produce the electrode with a coherent, hard metallic layer of zinc-magnesium alloy. For comparative purposes, two conventional ZnO-based electrodes were tested. The electrodes were cycled, as described in Example 1, in a cell containing a 35% KOH electrolyte.

The electrode compositions and cycling results are given in Table V.

TABLE V

| Electrode | | | Cycling | | Capacity* | |
|---|---|---|---|---|---|---|
| No. | Alloys | Weight | No. | Duration | Initial | Final |
| 1 | Zn - 5% Mg | 30 g | 300 | 6 months | 30% | 15% |
|   | Zn - 50% Mg | 15 g | | | | |
| 2 | Zn - 7% Mg | 30 g | 750 | 16 months | 30% | 35– |
|   | Zn - 50% Mg | 15 g | | | | 40% |
| 3 | Zn - 10% Mg | 30 g | 1100 | 16 months | 30% | 8% |
|   | Zn - 50% Mg | 15 g | | | | |
| 4 | ZnO on Cu grid | | 350 | 7 months | 75% | 8% |
| 5 | ZnO on Mg grid | | 350 | 7 months | 78% | 10% |

*percentage of theoretical

Electrode 1 failed after 6 months due to a corroded connector. Electrode 2 did not show failure after 16 months and continued to cycle. Electrode 3 failed after 16 months due to very low capacity. The conventional electrodes 4 and 5 substantially failed after 350 cycles due to high resistance and shorting, respectively.

EXAMPLE 6

Two electrodes were fabricated to evaluate the effect of the inclusion of aluminum in the active material of a zinc-magnesium electrode on the electrode capacity. An electrode containing no aluminum in the active mix was fabricated for comparison.

The electrodes were made by inserting and packing particles of active material into perforated copper tubes. One tube contained Zn-5%Mg, another contained Zn-10%Al-5%Mg and the third contained Zn-22%Al-5%Mg. The copper tubes acted as the current collector and the active material container. The two electrodes containing aluminum were leached overnight in 30% KOH to remove the aluminum and to leave a porous Zn-5%Mg active material in the copper tubes. The results are shown in Table VI.

TABLE VI

| Electrode | Maximum Capacity (% of theoretical) | Cycle Life | Final Capacity (% of theoretical) |
|---|---|---|---|
| Zn-5% Mg | 30 | 33 | 25 |
| Zn-10% Al-5% Mg | 43 | 70 | 25 |
| Zn-22% Al-5% Mg | 63 | 45 | 25 |

The electrodes were removed from cycle tests when the capacity dropped to 25% of theoretical, not because of electrode failure.

This example shows how the inclusion of aluminum in the electrode active material alloy, and subsequent leaching therefrom, improves the electrode performance by increasing the electrode porosity.

From the foregoing examples it is clear that zinc electrodes fabricated from an active material of zinc and magnesium will result in zinc electrode-containing batteries that have an extended cycle life. Electrodes made from blends of zinc powder and magnesium powder do not have the intimate blend of zinc and magnesium as an alloy. It is also clear that the formation of dendrites is suppressed for electrodes that have an active material comprising zinc-magnesium alloy.

It is understood that changes and modifications may be made in the embodiments of the invention without departing from the scope and purview of the appended claims.

We claim:

1. A zinc electrode for use in an alkaline battery consisting of a current collector and an active material applied to said current collector, said active material comprising zinc-magnesium alloy containing magnesium in the range of from about 1% to about 15% by weight.

2. A zinc electrode as claimed in claim 1, wherein said alloy contains magnesium in the range of about 1% to about 10% by weight.

3. A zinc electrode as claimed in claim 1, wherein said electrode contains an effective amount of an additive metal capable of reducing the hydrogen overvoltage of the electrode.

4. A zinc electrode as claimed in claim 2, wherein said electrode contains an effective amount of an additive metal capable of reducing the hydrogen overvoltage of the electrode.

5. A zinc electrode as claimed in claim 1, wherein said electrode contains an effective amount of an additive metal capable of increasing the porosity of the electrode by removal of said additive metal.

6. A zinc electrode as claimed in claim 2, wherein said electrode contains an effective amount of an additive metal capable of increasing the porosity of the electrode by removal of said additive metal.

7. A zinc electrode as claimed in claim 3, wherein said electrode contains an effective amount of an additive metal capable, of increasing the porosity of the electrode by removal of said additive metal.

8. A zinc electrode for use in an alkaline battery consisting of a current collector, made of metal chosen from the group consisting of copper, silver, titanium, stainless steel and magnesium, and an active material applied to said current collector by compaction, die-pressing, cold-welding, sintering, or mixing with a binder material, a filler material or both and heating, said active material comprising zinc-magnesium alloy containing magnesium in the range of from about 1% to about 15% by weight.

9. A zinc electrode as claimed in claim 8, wherein said alloy contains magnesium in the range of about 1% to about 10% by weight.

10. A zinc electrode as claimed in claim 8, wherein said alloy additionally contains about 1% by weight of a metal chosen from the group consisting of lead, indium, thallium, mercury and cadmium.

11. A zinc electrode as claimed in claim 9, wherein said alloy additionally contains about 1% by weight of a metal chosen from the group consisting of lead, indium, thallium, mercury and cadmium.

12. A zinc electrode as claimed in claim 8, wherein, said alloy additionally contains an effective amount of an additive metal capable of increasing the porosity of said electrode by removal of said additive metal.

13. A zinc electrode as claimed in claim 9, wherein said alloy additionally contains an effective amount of an additive metal capable of increasing the porosity of said electrode by removal of said additive metal.

14. A zinc electrode as claimed in claim 10, wherein said alloy additionally contains an effective amount of an additive metal capable of increasing the porosity of said electrode by removal of said additive metal.

15. A zinc electrode as claimed in claim 8, wherein said alloy additionally contains aluminum in an amount of about 5% to about 25% by weight of the zinc.

16. A zinc electrode as claimed in claim 9, wherein said alloy additionally contains aluminum in an amount of about 5% to about 25% by weight of the zinc.

17. A zinc electrode as claimed in claim 8, wherein said alloy additionally contains aluminum in an amount of about 22% by weight of the zinc.

18. A zinc electrode as claimed in claim 9, wherein said alloy additionally contains aluminum in an amount of about 22% by weight of the zinc.

19. A zinc electrode as claimed in claim 8, wherein said alloy additionally contains about 1% by weight of a metal chosen from the group consisting of lead, indium, thallium, mercury and cadmium and additionally contains aluminum in an amount of about 5 to 25% by weight of the zinc.

20. A zinc electrode as claimed in claim 9, wherein said alloy additionally contains about 1% by weight of a metal chosen from the group consisting of lead, indium, thallium, mercury and cadmium and additionally contains aluminum in an amount of about 5 to 25% by weight of the zinc.

21. A method of producing a zinc electrode which comprises the steps of forming a zinc-magnesium alloy containing from about 1% to about 15% by weight of magnesium, forming a particulate of said alloy, and applying the particulate alloy to current collector by one of compaction, die-pressing, welding, sintering, and mixing with a binder material, material or both and heating.

22. A method claimed in claim 21, wherein said particulate alloy has in the size range of about 37 to 150 microns.

23. A method as claimed in claim 22, wherein said alloy contains magnesium in the range of about 1% to about 10% by weight.

24. A method as claimed in claim 23, wherein said alloy additionally contains about 1% by weight of a metal chosen from the group consisting of lead, indium, thallium, mercury and cadmium.

25. A method as claimed in claim 24, wherein said alloy additionally contains aluminum in an amount of about 5% to about 25% by weight of the zinc, and wherein said electrode is leached after applying the particulate alloy to the current collector for removal of the aluminum, whereby the porosity of the electrode is increased.

26. A method as claimed in claim 24, wherein said alloy additionally contains about 22% by weight aluminum by weight of the zinc, and wherein said electrode is leached after applying the particulate alloy to the current collector for removal of the aluminum, whereby the porosity of the electrode is increased.

27. A method as claimed in claim 23, wherein said alloy additionally contains aluminum in an amount of about 5% to about 25% by weight of the zinc, and wherein said electrode is leached after applying the particulate alloy to the current collector for removal of the aluminum, whereby the porosity of the electrode is increased.

28. A method as claimed in claim 23, wherein said alloy additionally contains about 22% by weight aluminum by weight of the zinc, and wherein said electrode is leached after applying the particulate alloy to the current collector for removal of the aluminum, whereby the porosity of the electrode is increased.

29. A method as claimed in claim 21, wherein the current collector is an expanded metal mesh made of a metal selected from the group consisting of copper, silver, titanium, stainless steel and magnesium.

30. A method as claimed in claim 22, wherein the current collector is an expanded metal mesh made of a metal selected from the group consisting of copper, silver, titanium, stainless steel and magnesium.

31. A method as claimed in claim 23, wherein the current collector is an expanded metal mesh made of a metal selected from the group consisting of copper, silver, titanium, stainless steel and magnesium.

32. A method as claimed in claim 24, wherein the current collector is an expanded metal mesh made of a metal selected from the group consisting of copper, silver, titanium, stainless steel and magnesium.

33. A method as claimed in claim 25, wherein the current collector is an expanded metal mesh made of a metal selected from the group consisting of copper, silver, titanium, stainless steel and magnesium.

* * * * *